US006898935B2

(12) United States Patent
Barber et al.

(10) Patent No.: US 6,898,935 B2
(45) Date of Patent: May 31, 2005

(54) SYSTEM AND METHOD OF COOLING STEAM TURBINES

(75) Inventors: Steven J. Barber, Louisville, KY (US); Paul K. Trygstad, Aurora, CO (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/628,035

(22) Filed: Jul. 25, 2003

(65) Prior Publication Data

US 2005/0016175 A1 Jan. 27, 2005

(51) Int. Cl.⁷ ............................................. F01K 13/02
(52) U.S. Cl. .......................... 60/646; 60/657; 60/658; 60/806; 60/912; 60/39.182; 415/116; 415/180
(58) Field of Search .................... 60/646, 645, 657, 60/658, 806, 912, 39.34, 39.49, 39.182, 782, 785; 415/115, 116, 177, 180

(56) References Cited

U.S. PATENT DOCUMENTS 3,949,549 A * 4/1976 Holl .......................... 60/226.1
5,388,960 A * 2/1995 Suzuki et al. ................ 415/176
6,233,937 B1 * 5/2001 Gray ............................ 60/646
6,487,863 B1 * 12/2002 Chen et al. .................... 60/782

OTHER PUBLICATIONS

Praxair Technology, Inc., "Nitrogen Services Purging, displacing, blanketing, drying, cooling, heating, pressure testing, leak testing—and more—with 99.9% pure nitrogen gas," 1998.

North American Electric Reliability Council, "Reliability Assessment 2002–2011 The Reliability of Bulk Electric Systems in North America," Oct. 2002.

* cited by examiner

*Primary Examiner*—Thomas Denion
*Assistant Examiner*—Kyle M. Riddle
(74) *Attorney, Agent, or Firm*—Locke Liddell & Sapp LLP

(57) ABSTRACT

A system and method of cooling a steam turbine having internal moving components to a predetermined temperature by controlling a flow of nitrogen through the turbine, thus decreasing the downtime associated with maintaining the turbine. This provides a more efficient and cost effective method of operating a power plant.

19 Claims, 5 Drawing Sheets

SYSTEM AND METHOD OF COOLING STEAM TURBINES

FIELD OF THE INVENTION

This invention relates to the field of maintenance of steam turbines having moving internal components, namely in the power generation industry.

BACKGROUND OF THE INVENTION

In the power industry, electricity is produced with a spinning turbine that is turned at high speeds to generate electricity. This turbine can be turned by water, by gas, or by high temperature steam. The steam turbine is driven by high temperature steam from a conventional boiler reactor or nuclear reactor at speeds averaging 1800 to 3600 rpm. Many of the modern stream turbines operate at temperature in excess of 1,000° F.

Approximately 49 percent of the U.S. power generation in 2003 was coal-fired and 28 percent of the generation from nuclear fuel sources. Both fossil and nuclear steam turbines experience substantial cool down time delays associated with planned major outages, planned minor outages, and unplanned outages. A typical steam turbine requires a minimum of one week to cool down to ambient temperatures using the current methods of shutdown and outage disassembly. This inefficiency represents a substantial amount of lost production and associated revenues for a given generating unit on an annual basis.

Power plant steam turbine metal temperatures cool down at a fairly rapid rate while steam is flowing through the turbine and the generator is connected to the electrical grid. However, most all plant designs include provisions to close the steam turbine valves when the turbines are removed from service. These design provisions are included for many reasons, one of which is to prevent slugs of water from traveling through the steam turbine and causing damage to the blades and other components. The technical term for this is "turbine water induction" and the American Society of Mechanical Engineers ("ASME") developed a steam turbine design standard many years ago after turbine water induction failures were reported in the industry.

When steam turbines are removed from service the emergency stop valve and the control valves remain in the closed position. This restricts steam flow through the steam turbine and results in a "bottled up" steam turbine. Typical steam turbines with weights of 125 to 200 tons and operating temperatures of 1000° F. have significant thermal mass. After removing the steam turbines from service, the shell and rotor temperature remains above 700° F. at many locations while the turbine is "bottled" up for many days. Even after one week of conventional cooling down methods, it is not uncommon to measure temperatures in excess of 150° F. on the rotor and thick shell locations.

The prior art fails to provide for a cooling down large steam turbines at electrical generation stations. Steam turbine sizes increased rapidly from 1950 to 1970. During this period, manufactures focused on minimizing rotor stresses and reducing large temperature changes to that result in shell cracking. Moreover, the prior art failed to minimize turbine outages to the extent that commonly exists today. Therefore, there exists a need to cool down steam turbines and to optimize outage time.

The prior art has approached these problems by pre-staging and mobilizing while the turbines are in a cooling down period. Generally, the cool down period in the prior art is concurrent with the disassembly of the steam turbine and occupies the first week of most outages. In recent years the electric utility industry has attempted to reduce the costs associated with turbine outages. The prior art has focused on rapid disassembly and repair techniques while accommodating this cool down period. Therefore, a need exists to improve and optimize outages associated with steam turbines in the electric utility industry that would offer cost incentives associated with electric production including replacement power costs, labor costs, repair costs, and plant operating availability requirements.

There are many factors that attribute to the cool down time of a steam turbine. When turbines are taken off-line or removed from service, electrical breakers are opened, thus removing the generators from the electrical grid. Next, the main steam stop valve and control valves shut automatically to prevent damage due to water induction. The turbine is de-pressurized minutes after shut-down but the steam turbine is in effect "bottled up" as it related to metal temperature. There is no substantial cooling fluid available internally and the turbine cools very slowly as heat escapes only through the shell and outer insulation. After a steam turbine is removed from the grid, the turbine is allowed to spin freely from its nominal operating speed down to approximately 90 rpm in twenty to thirty minutes.

During the spin-down there is usually only minimal steam flow in the reverse direction through the high pressure turbine to prevent excessive temperatures due to steam stagnation. The lube oil system remains in operation while the "hot" turbine is on turning gear until the first stage metal temperature reaches approximately 500° F. This takes approximately 40 to 80 hours depending on the turbine. At this time the oil system can be taken offline and the turbine can be completely disassembled. The initial outer and inner shells are often removed with some component temperatures at several hundred degrees Fahrenheit. The turbine rotor usually is removed and placed on the stands near the turbine with internal temperatures exceeding 150° F. Most high pressure turbine rotors are not physically removed from the inner shell casing until five to eight days after the unit is taken off-line.

Though there is no consistent method of turbine disassembly, the turbine is disassembled hot and cooling occurs after disassembly in the prior art. The current practices are followed to reduce the metal temperatures without damage to the turbine. In the prior art, cooling down the turbine assembly can only occur as long as steam flows through the turbine.

Because these methods require workers to disassemble the turbine prior to the cool down process, cool down the turbine and disassembly may occur at temperatures between 200 and 500° F. The rate of turbine cool down depends on the willingness of workers to work on hot components, safety concerns, rigging limitations, and insulation removal activities. On large steam turbines, meaningful turbine cooling of the shell is usually not achieved until the crossover pipe between the high pressure turbine section and/or intermediate pressure turbine sections and the low pressure turbine section is removed. This is usually not attempted until the turbine's metal temperatures are less than 600° F. Once the crossover pipe is removed, the rate of cooling due to air convection increases dramatically. In summary, this method does not provide reasonable, efficient, or adequate cooling for outage and cost optimization.

The prior art offers two methods to improve the cooling time associated with large steam turbines. The primary method of reducing the cool down time is to force cool the turbine components prior to bringing the turbine off-line. This typically consists of reducing the main steam temperature just prior to removing the steam turbine from service. The main steam temperature is reduced by closing the extraction steam sources to the feedwater heaters, reducing steam temperature through attemperation, and slowly lowering the steam temperature to near saturation temperatures. This forced cool down method is expected to be used on 400 megawatt and larger units.

Though this method of forced cool down removes a substantial amount of heat from the steam turbine, the saturation temperature limitations and potential for water induction fails to provide for a substantial cool down of the steam turbine. This method only cools the turbine down from over 1000° F. to temperatures between 700–900° F. in the high pressure turbine section of the turbine. This only saves about one to about one and one half days in the unit's outage shutdown.

Moreover, this method offers the additional problem that even after this forced cool down, the operator cannot shut off the lubrication system on the turbine and the operator cannot disassemble the turbine until the metal temperatures are between 500–600° F. Furthermore, there is a significant hazard with disassembling the turbine at this high temperature.

In addition, using this cool down method while the unit is still in service may fail because the turbine operations will trip for several reasons. Therefore, this method of forced cool down is unable to offer an efficient method of cooling down the turbine to allow maintenance of the turbine. Moreover, the calibration of station instrumentation, the condition of level detection devices, the inadequate operational staff during shutdown, the system power levels and load changes, the boiler tuning, and the other plant configuration matters will further limit the usefulness of this method.

The second method of the prior art is air cooling. Various air horns are placed at limited internal access points throughout the turbine. This method does not provide efficient cool down of the turbine because air at near ambient pressure does not provide enough heat transport and non-uniform distribution of cooling. This method results in humping, which is stagnant steam distributing in large turning shells in a manner that stratifies the steam and results in convective heating that is cooler on the bottom and warmer on the top. This problem occurs when the turbine is "bottled up" with hot steam and the metal is slightly longer at the top of the shell than at the bottom of the shell. This misalignment can cause rotor contact.

This method is also deficient because of limited accessibility, limited compressed air capacity, and non-uniform distribution of cooling throughout the turbine. These three factors result in not only a lack of cooling capacity but problems with shell humping and non-uniform component cooling. Moreover, two limitations of forced cooling using air injection are adequate cooling capacity and uniform cooling. This method has only been shown to save minimal time in the shut down of steam turbines.

The electric utility industry has experienced dramatic changes over the past two decades and continues to encounter significant competitive changes associated with the generation of electricity. These competitive changes are a driving force to produce electricity more efficiently and cost effectively. Electric utility power plant outages are an integral part of the electric power industry and therefore are a critical component in evaluating electrical demand and the ability to satisfy the demand through generation resource allocation.

These outages consist of both planned and unplanned events that have variable time durations depending on various factors. The cost consequences of outages is highest during summer and winter peak power demand periods, whereas outage costs during other time periods are more predictable. Other factors that influence outage consequences include reduced electric capacity, power plant age, wholesale market price and volatility, environmental regulations, electric deregulation, and other factors. With respect to power plant age, it is noted that the average age of most of the large power plants in the U.S. is over 30 years which emphasizes the importance of regular scheduled maintenance outages which in turn requires time and money. Therefore, a need exists to minimize the costs associated with an outage by reducing the amount of time needed to service the turbines.

Flows of nitrogen have been used in different arts, but this technology has not been implemented on devices with internal moving parts. In the chemical, petrochemical and oil refining industry, various reactor vessels that operate at 1,000° F. are taken off line for maintenance. These processes are used to reduce crude oil to useable end products. These large reactor vessels contain various catalysts that aid the crude processing. These catalysts become spent and are required to be periodically replaced. The reactor vessels must be cooled down from their operating temperatures over 600° F. to less than 100° F. The process equipment being cooled in this art are reactor vessels that are stationary and static with no moving parts. Care must be taken to not cool the metal to-too fast that can cause metal fatigue and cracking from stresses caused from shocking the metal. For vessels with no moving parts, liquid nitrogen has been forced through vessels having metal surfaces at greater than 350° F. Most metal can be cooled down at rates of 75–100° F. per hour.

In the early 1980s, Union Carbide Industrial Services used liquid nitrogen to cool down reactor vessels instead of recycling process nitrogen and hydrogen gases through the units compressor systems. In operation, the plant systems allowed recycling the gas through the reactor to absorb heat, and then passing that gas through the system's heat exchangers to cool the gas. The compressors pumped the gas back through the reactor to force cooling. This required four to six days to obtain temperatures below 100° F.

In contrast, a steam turbine operates under very dramatic conditions with a large spindle spinning at 3600 rpm inside a stationary shell. The heat shrinkage of the stationary shell to the spindle and the stationary shell to the spindle blades of the turbine is a factor. If the cooling is not completed with careful control so that all parts of the machinery cool at the same rate, damage can occur to the machine with spinning parts coming into contact with stationary parts, humping occurring, and the weight of the turbine shifting from one end to the other too fast, thus causing damage. Therefore, a need exists to provide for a cool down of a turbine with moving internal parts such that the cool down rate may be controlled.

SUMMARY OF THE INVENTION

The present invention offers a cool down method applicable to rotating and moving equipment in the electric power generating industry including steam turbines. By using a flow of nitrogen, preferably a forced flow of nitrogen, the present invention may improve the efficiency of power plant outages by reducing the cool down time associated with large steam turbines. This cool down period can represent a substantial cost if the outage occurs at critical electrical power market conditions. This cost becomes much more substantial and can result in extreme costs if the market conditions increase over $50 per megawatt.

Nitrogen is pumped as a gas into a moving steam turbine machine in a controlled manner. This method prevents stress cracking the turbines metals without causing the machine to warp, humping, or have uneven cooling across the machine that could cause moving parts to come into contact with non-moving parts. This invention is also capable of preventing overspeeding of the blades of the turbine above their design speed.

The present invention also allows for faster shut down for cleaning. Power plants shutdown and need to cool the turbine for many reasons including cleaning. Prior to cleaning, the steam turbine metal temperature may need to be below 175° F. Therefore, the present invention provides for greater opportunity to clean the internal components of the turbine. In the preferred embodiment, a steam turbine coming off production will have a temperature profile of 500–1,000° F. across the machine.

The present invention provides a flow of nitrogen from a nitrogen pumper to a flow control station installed under the steam turbine. The nitrogen pumper pumps the nitrogen through a single piping header into the area under the steam turbine. The gas is divided into different flow streams in a nitrogen flow control station, which is designed to control the nitrogen flow and temperature being delivered to different sections of the turbine.

The present invention may also take advantage of the many different types of instrumentation that already exist on the turbine to monitor temperature, vibration, and growth or shrinkage of the machine as it operated. As the nitrogen gas is introduced into various ports or connections on the steam turbine, these instruments are monitored across the machine to monitor how the machine is reacting to the rate that the nitrogen is being introduced. The ports or connections used on the turbine for nitrogen injection will depend on the various designs that exist in the power industry today.

Therefore the different methods discussed herein provide options for applying the nitrogen without damaging the internal, moving components of the turbine by uneven cooling, rapid cooling, or over-spinning. With the nitrogen flow control station, nitrogen can be introduced to different areas of the turbine at different temperatures and/or different flow rates and cooling or heating can be accomplished at different rates in different areas of the turbine so that the machine is cooled down evenly without damage.

The force cooling of power plant steam turbines is significantly different than the cooling down of process equipment. The rate of metal contraction in a large steam turbine is significant. A steam turbine is a large piece of equipment that is designed to grow and shrink over a foot in length as it goes on and off production. The growth of the steam turbine varies with size from the simple equation:

$$\Delta Length = \alpha Length \text{ of steel turbine casing} \times \Delta Temperature \text{ in } °F.$$

$\alpha$ is the coefficient of thermal expansion for a given material and is in the $10^6$ range. Therefore, the typical growth is from about two inches to about 12 inches on a very large turbine.

Because the clearance tolerance between the casement and the spindle is so tight, the rate of shrinkage of the different parts of the machine is important to the cool down process. Thus the control of the cool down temperatures is significant. It is envisioned that the present invention will be able to reduce the cool down period from the five to eight days of the previous methods to less than approximately two days, preferably less than about 36 hours. This invention also offers a costs saving by providing a quicker shutdown or turnaround time and by extending the production of electricity during the cool down process.

The present invention may be incorporated into or used on a variety of turbines via a variety of turbine connections that are different depending on the manufacturer of the turbine. The present invention is described in conjunction with one embodiment of the invention, but those skilled in the art recognize that the teachings herein are equally applicable to different embodiments with varying connections.

In the preferred embodiment the present invention provides a method of cooling a steam turbine having internal moving components to a predetermined temperature, wherein the steam turbine comprises a main steam inlet piping connected to the turbine and a cold reheat line connected to the turbine such that a flow of steam first moves from the main steam inlet piping to the turbine and then the flow of steam moves from the turbine to the cold reheat line during operation, the method which includes the steps of stopping the flow of steam, introducing a flow of nitrogen to the turbine until the turbine reaches the predetermined temperature while controlling the flow of nitrogen to prevent damage to the moving components of the turbine, and stopping the flow of nitrogen. This method may also include a hot reheat line connected to the turbine and a condenser vacuum relief line connected to the turbine such that a flow of steam first moves from the hot reheat line to the turbine and then the flow of steam moves from the turbine to the condenser vacuum relief line during operation, wherein the flow of nitrogen in also moves from the hot reheat line to the turbine and then the flow of nitrogen moves from the turbine to the condenser vacuum relief line.

The method may also include a main steam inlet piping drain line connected to the main steam inlet piping, the method wherein the flow of nitrogen moves from the main steam inlet piping drain line to the main steam inlet piping. In a preferred embodiment, the method includes a cold reheat drain pots connected to the cold reheat line, the method wherein the flow of nitrogen moves through the cold reheat drain pots to the cold reheat line. Each of these methods benefits from controlling the flow of nitrogen with a computer control system.

The present invention also includes a system for cooling a steam turbine to a predetermined temperature using a flow of nitrogen, the system including a steam turbine, a main steam inlet piping connected to the turbine, a cold reheat line connected to the turbine, and a control station for controlling the flow of nitrogen to prevent damage to the moving components or the turbine wherein the steam turbine, the main steam inlet piping, and the cold reheat line are adapted to accommodate the flow of nitrogen. This system may also include a hot reheat line connected to the turbine and a condenser vacuum relief line connected to the turbine wherein the hot reheat line and the condenser vacuum relief are adapted to accommodate the flow of nitrogen. In another embodiment, the system may also include a main steam inlet piping drain line connected to the main steam inlet piping wherein the main steam inlet piping drain line is adapted to accommodate the flow of nitrogen. This invention may also include cold reheat drain pots connected to the cold reheat line adapted to accommodate the flow of nitrogen. The controller of this system is a computer control system wherein the computer control system is adapted to control the flow of nitrogen in a preferred embodiment.

This invention also provides for a more efficient and cost effective method of operating a power plant by using the methods listed above to reduce downtime by cooling each steam turbine using the inventive concepts as disclosed and claimed herein.

BRIEF DESCRIPTION OF THE DRAWINGS

The accompanying drawings, which are incorporated in and form a part of the specification, illustrate the embodiments of the present invention, and, together with the description, serve to explain the principles of the invention. In the drawings.

Figure 1:
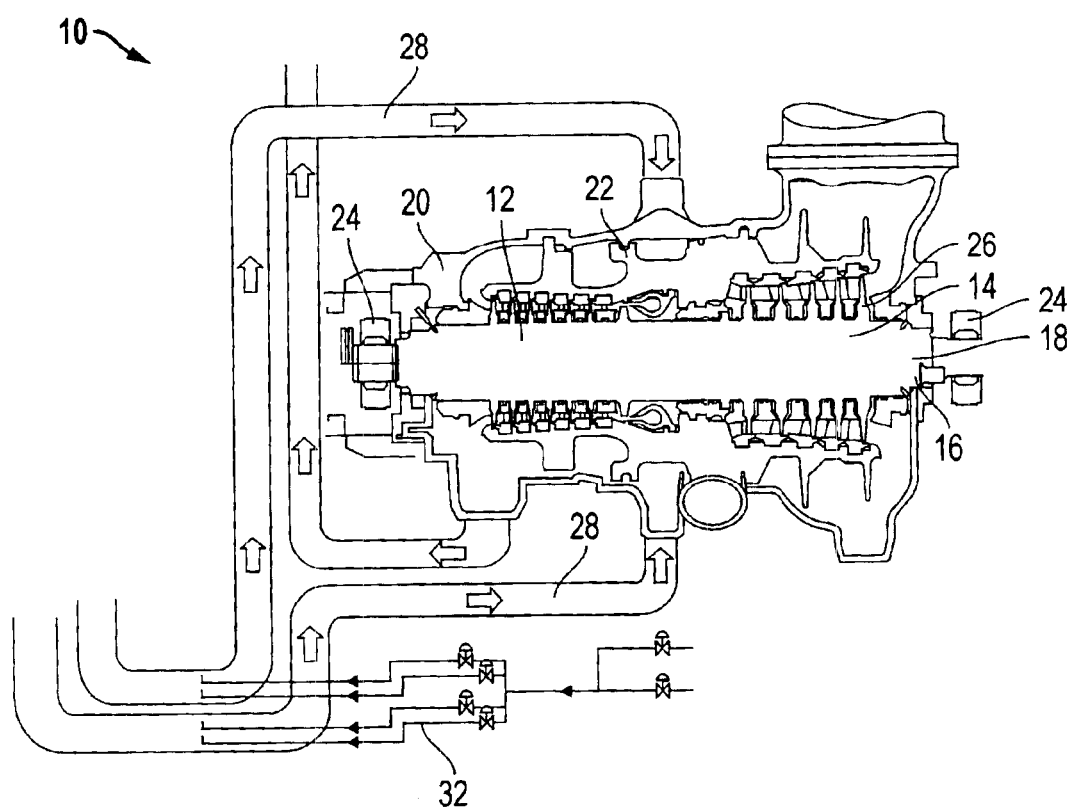
FIG. 1 is diagram including a cross sectional view of an embodiment of the present invention.

It is to be noted that the drawings illustrate only typical embodiments of the invention and are therefore not to be considered limiting of its scope, for the invention encompasses other equally effective embodiments. Nitrogen injection points will vary due to the different designs and piping configurations that exists on the existing turbine in the power production market.

DETAILED DESCRIPTION OF PREFERRED EMBODIMENT

The present invention offers forced cooling of a flow of nitrogen such that a steam turbine may be cooled in a shorter period of time. In a most preferred embodiment, it is expected that a typical large fossil steam turbine unit between 200 and 850 megawatt ("MW") may be cooled in less than about 48 hours, more preferably less than about 36 hours, most preferably about 24 hours. In fact, it is envisioned that a cool down could be accomplished in as little as about four to about 15 hours in a most preferred embodiment. The time required is dependent on the overall mass of the turbine and the nitrogen flows that can be obtained. The cooling time will be determined by the difference between the time of operation and the time at which the turbine has cooled down from the range of about 350° F. to about 700° F. to a predetermined temperature such as less than about 100° F. to about 200° F. It is expected that substantial differences between turbine sizes, manufactures and power plant system will exist and therefore affect this cooling time.

In another embodiment, the present invention may be used for pre-heating of the steam turbine as well. This may result in some start-up time savings of about 4 to about 40 hours, depending on the unit considered and the type of power plant start-up performed. Once this technology is implemented in a plurality of locations, there will be an overall capacity increase of U.S. electric power generation for National Electric Reliability Council ("NERC") regions or for individual utilities. After studying the outage schedule produced for each NERC region and an expected outage time savings for the combined power plants, it is likely that being able to put power plants back on-line sooner by the present invention may result in more overall electric energy produced by the U.S. as a whole or by a separate region. The present invention may also be used in combination with other technologies. For example, nitrogen injection may be used on other power plant equipment for purposes of corrosion prevention. In a preferred embodiment, the present invention includes a braking device to allow controlling the turbine rotation speed at a turning gear speed. These designs would address the need to not over spin the turbine with the nitrogen inject and preferably maintain a controlled and constant rotation speed less than operational design spin but sufficient to facilitate the flow of nitrogen through the machine. This device would be installed on the turbine/generator shaft to control the speed of the turbine-to-turbine gear speeds. This provides enough torsional resistance to maintain the turbine at turning gear speeds and reduce the damage to the turbine in the event that the turbine rotor expands or contracts relative to the shell.

FIGS. 1–5 show several different embodiments of the present invention with respect to a steam turbine. Those skilled in the art will recognize that the concepts disclosed and taught herein are applicable to steam turbines and similar with internal, moving elements. Nothing herein is intended to limit this teaching to any particular type of steam turbine. The inventive aspects of using the injection points of steam turbines in this manner is equally applicable to any manufacturer's turbines.

This steam turbine 10 features an opposed flow high pressure turbine section 12/intermediate pressure turbine section 14 on a single turbine 10 and an opposed flow low pressure turbine section 16 on a single rotor 18. This design is exemplary of the large steam turbines in the United States and around the world. This turbine 10 is typical of the materials, weights, sizing, rotors, and shells of other makes and models. Those skilled in the art recognize that variations will exist depending on the size of other steam turbines, shell thickness, flow configuration, manufacture, and power rating.

FIGS. 1–5 show different arrangements of flow paths for the flow or flows of nitrogen throughout the turbine 10 for the purpose of cooling. These flow paths are examples of the methods of cooling a steam turbine. Of note, the direction of the flow of nitrogen, the size and capacity of the piping, the heat load stratification of steam turbine shells and rotor, the location of nitrogen injection, the location of nitrogen discharge, the confined space and oxygen depravation considerations, the flow capacity of nitrogen, and the cooling transport affect the teachings of the invention.

The path of the flow of nitrogen through the turbine 10 is a focus of the invention. The forced cooling can be accomplished in any path/flow direction. However, the steam turbine 10 will cool at a faster rate if the flow of nitrogen is injected on the cooler side of the turbine shell, shown as outer shell 20 and inner shell 22, and discharged nearest the location of the highest turbine shell metal temperature. This provides the highest nitrogen-to-metal mismatch temperature throughout the steam turbine 10.

The second item to consider related to the nitrogen flow direction is the speed of the steam turbine 10. The "free spinning" of the turbine/generator set affects the cooling time of steam turbines. The steam turbine is by design a nearly frictionless mass of rotating machinery. The turbine system is designed to reduce rotational losses in an effort to reduce power losses, reduce bearing 24 size, and generally increase the overall efficiency of the steam turbine 10. The bearings 24 of a large steam turbine are an important critical machined component and provide a near frictionless surface.

Typically all bearings 24 in a steam turbine 10 are babbit bearings including the thrust bearings. All bearing surfaces of modern steam turbines include forced lubrication and thermocouples for precise monitoring of bearing temperatures. Therefore, the flow of nitrogen will have direct relationship with speed. In some embodiments, the flow of nitrogen is in the opposite direction to counteract the rotational speed effect of the blades 26 of the turbine 10 created by the flow of nitrogen.

The turbine 10 shown in FIGS. 1–5 is an opposed flow design. Steam turbines are designed to operate at normal speeds up to 3600 rpm while avoiding certain turbine speeds associated with resonant turbine rotor frequencies. Precise turbine rotor frequency ranges are available from the manufacture and will vary with design.

During the cooling process, the vibration levels associated with the speed of the blades 26 of the turbine 10 are not substantially different with nitrogen than steam. Therefore, it is important during nitrogen forced cooling that the turbine speed needs to be less than 3600 rpm and outside the vibration frequencies for a given turbine.

Nitrogen forced cooling can be accomplished at various speeds, depending on the desired cooling flow. Rotor 18 speed may increase rapidly if the flow is increased or unbalanced suddenly. Therefore, it is important to not overspeed during operation and during cool down to prevent permanent damage to the rotor 18 and blades 26. Therefore, it is important to have a device or method of controlling the flow of nitrogen to prevent overspeed conditions.

The size of the piping connections, such as the main steam inlet piping 28 and the cold reheat line 30 shown in FIGS. 1–5, and their capacity limitations are important to determine the nitrogen cooling capacity. Most methods will be generally limited to the existing standard piping available at the steam turbines.

Because steam turbines transfer work in the form of steam energy to mechanical machine inertia or torque, the steam pressure and temperature in the form of heat energy or enthalpy is reduced in the process of flowing through each set of turbine blades during operation. Therefore, there is stratification from about 1000° F. to about 600° F. for most high pressure turbine sections and intermediate pressure turbine sections.

Therefore, the present invention benefits from producing a flow of nitrogen in the same direction as an increase in metal temperature. This provides cooling flow through the steam turbine 10 and minimizes the nitrogen gas to metal mismatch temperature. The nitrogen to metal mismatch temperature and its associated steam to metal mismatch temperature may be a surface metal stress limit for the turbine shell 22 and the rotor 18. Steam turbines are designed in accordance with published steam to metal mismatch temperatures. The present invention provides for cooling while staying under the stress limits published by the turbine manufacture.

Moreover, the location of injection or introduction of the flow of nitrogen is important. Factors including the size of existing piping or connections, the length of piping runs, the location on the turbine, the ease of connection, the proximity to the nitrogen pump truck, and the turbine metal temperature should be considered.

The location of the nitrogen discharge is also important. Factors to consider include confined space safety, oxygen depravation, transport to atmosphere, and existing steam turbine and power plant piping. In general, it is preferable to accommodate the location of existing piping and connections and the location for discharge to atmosphere.

Turning to the confined space and oxygen depravation considerations, the use of large volumes of nitrogen in a power plant may require special consideration of confined space requirements for a given power plant and utility. It is important to vent the nitrogen in a manner that will not create an oxygen depravation issue in a confined space.

The cooling rate of the steam turbine is primarily influenced by the amount of flow of nitrogen through the turbine given that the heat capacity and temperature differential will be affected by a given turbine design and operating condition. In the present invention, the speed of the blades 26 of the turbine 10 will be the notable factor associated with the maximum pounds of the flow of nitrogen that can be controlled.

Focusing on FIG. 1, the turbine 10 includes an introduction of the flow of nitrogen at the main steam inlet piping drain lines 32 connected to the main stream lines 28. The flow of nitrogen moves from the main steam inlet piping drain lines 32 to the main stream lines 28 and then to the turbine 10. The flow of nitrogen then moves from turbine 10 to cold reheat line 30 with an exhaust at the cold reheat safety relief valve on the boiler roof (not shown). This method provides for nitrogen forced cooling with minimal piping connections and plant impact.

It is recognized that the main steam inlet piping drain lines 32 should be in-service service to conform to the ASME guidelines for prevention of water induction. However, once the main stop valve (not shown) is closed and blades 26 of the turbine 10 are placed on turning gear, this piping system is available for use in the cool down process of the present invention.

The flow direction in this embodiment is reverse of the more efficient, forward direction and will be limited by the steam turbine surface metal to nitrogen gas mismatch temperature. This method also includes the cooling of the high pressure turbine section 12 only. There is no nitrogen flow through the intermediate pressure turbine section 14 and low pressure turbine section 16 turbine sections. The cooling of the intermediate pressure turbine section 14 and the low pressure turbine section 16 will be through conductive means. As the high pressure turbine section 12 and rotor 18 cool, the heat flux moves in the direction of the high pressure turbine section 12, essentially pulling heat from the intermediate pressure turbine section 14 and the low pressure turbine section 16. The advantage of this embodiment is the relative simplicity and ease of implementation on existing turbine systems.

Figure 2:
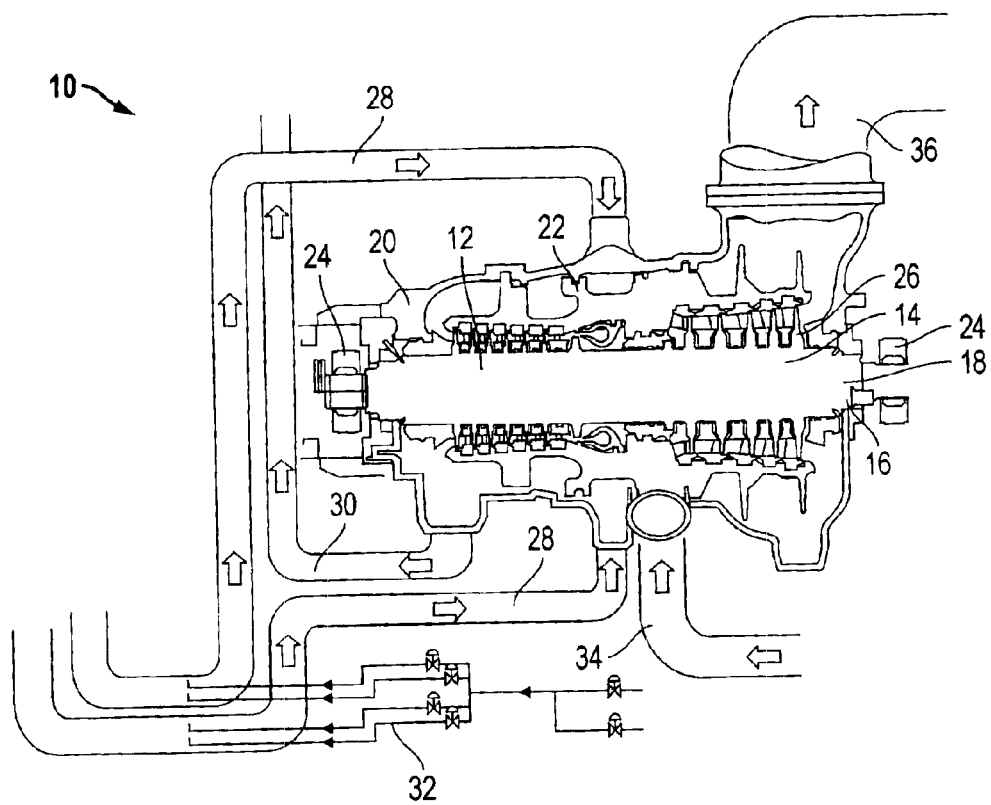
FIG. 2 is diagram including a cross sectional view of an embodiment of the present invention.

Turning to FIG. 2, the turbine 10 is shown in another embodiment. This embodiment includes additional piping connections: a hot reheat line 34 and a condenser vacuum relief line 36. This system and the method of its use include the same elements as shown in FIG. 1, but include a second flow path through the intermediate pressure turbine section 14 and downstream low pressure turbine section 16. The flow of nitrogen flows from the hot reheat line 34 to the turbine 10 and from the turbine 10 to the condenser vacuum relief line 36.

Both the high pressure turbine section 12 and the intermediate pressure turbine section 14 have flow directions in the less efficient direction, referred to herein as forward. However, this efficiency is balanced by the simplicity and relatively low-cost for implementation of this design. It is important to monitor and control the speed of the blades 26 of the turbine 10 in this embodiment.

Figure 3:
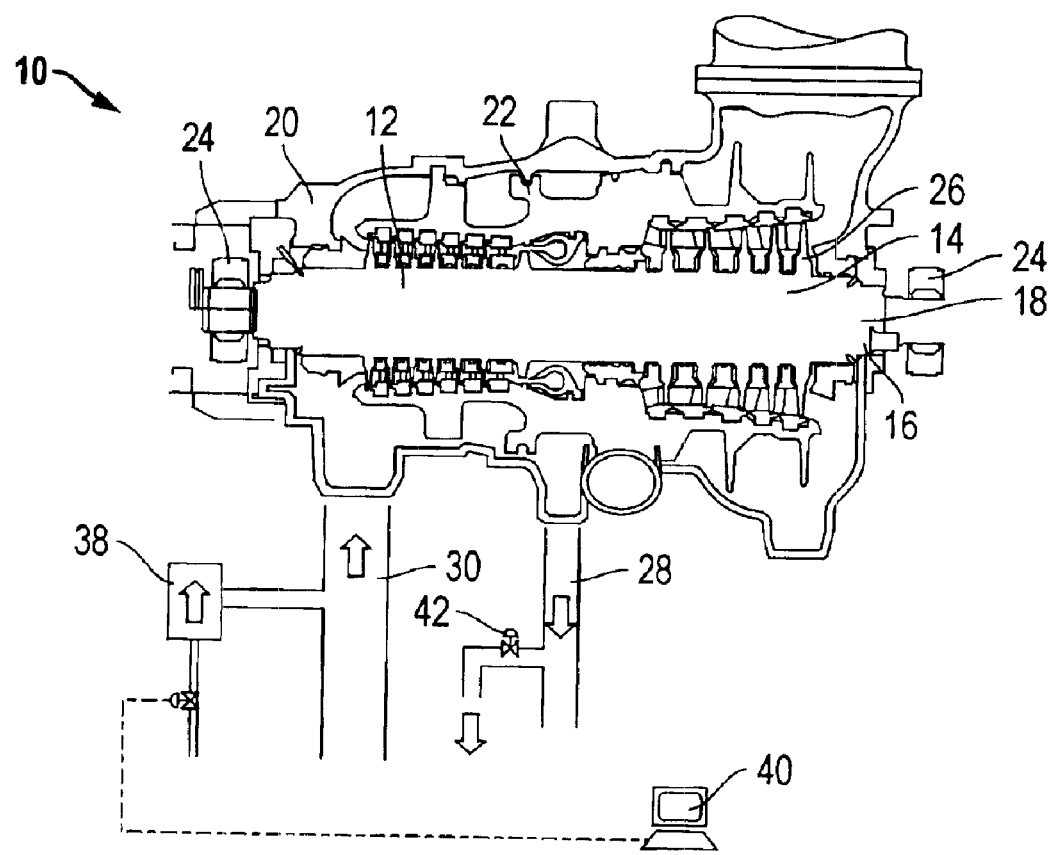
FIG. 3 is diagram including a cross sectional view of an embodiment of the present invention.

Referring to FIG. 3, an embodiment of the present invention is shown such that the flow of nitrogen is in the reverse direction through the high pressure turbine section 12 only. The flow of nitrogen is injected at the cold reheat line 30 from cold reheat drain pots 38 controlled by the controller 40. The flow of nitrogen moves from the cold reheat line 30 through the turbine 10 and from the turbine 10 to the main steam inlet piping 28.

The flow of nitrogen is then discharged to atmosphere through the blow down valve 42. Modem blow down valve 42 piping can either flow to the condenser or the roof in most cases. The roof is simpler and does not typically require piping modifications.

This embodiment is the first to show a controller 40, but the advantage of using a controller to monitor and moderate the flow of nitrogen through the turbine 10 is an important aspect of the invention. The controller 40 is adapted to control the flow of nitrogen to prevent damage to the moving components or the turbine, including uneven cooling, rapid cooling, or over-spinning.

Figure 4:
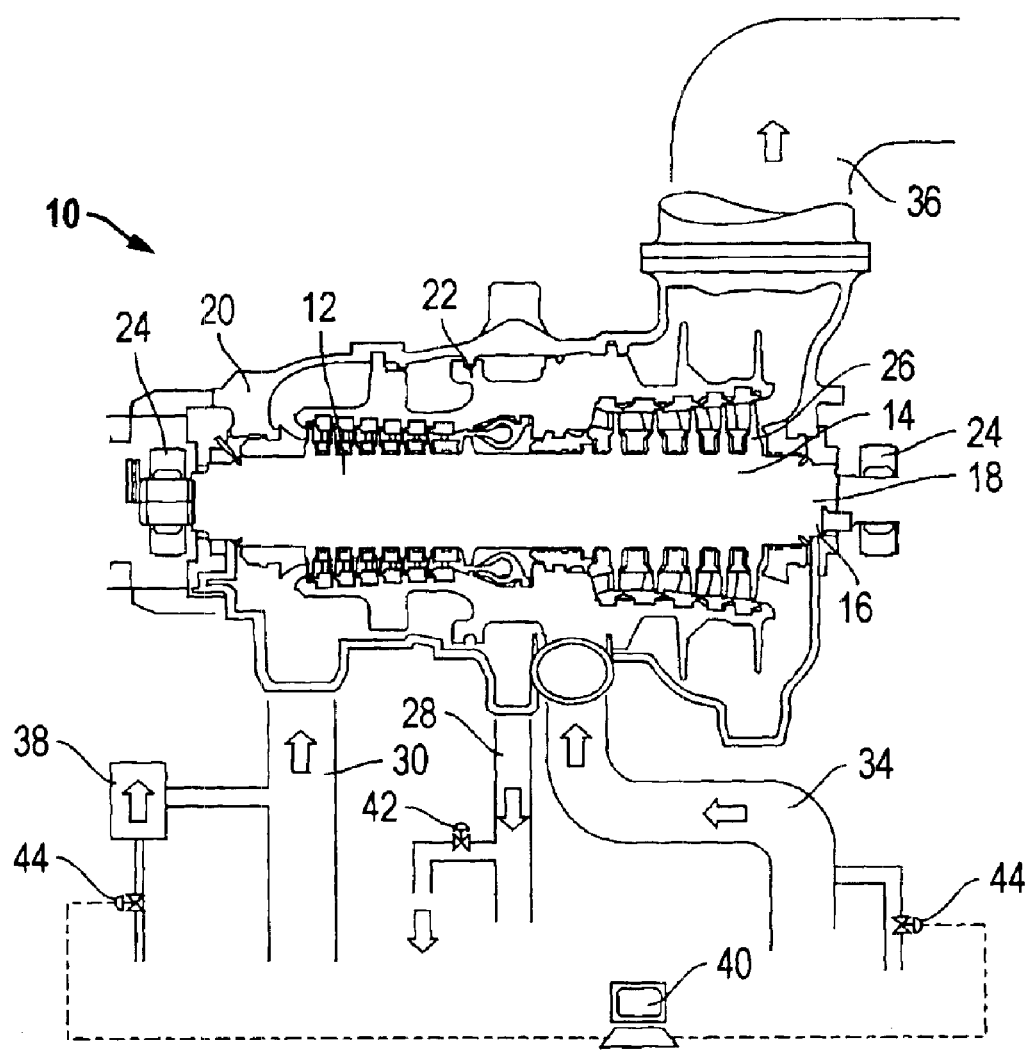
FIG. 4 is diagram including a cross sectional view of an embodiment of the present invention.

Turning to FIG. 4, another embodiment is shown. This system and method provide a flow of nitrogen to the high pressure turbine section 12 in the reverse direction and a forward flow of nitrogen to the intermediate pressure turbine section 14 and the low pressure turbine section 16. This provides a higher overall nitrogen gas flow at a lower turbine speed due to the counteracting effect of the work or torque on the high pressure turbine section 12 opposing the intermediate pressure turbine section 14 and the low pressure turbine section 16.

In this embodiment, the speed of the blades 26 of the turbine 10 are maintained by the flow of nitrogen managed by the controller 40 between important rotor frequencies less than 1000 rpm. The controller 40 adjusts two nitrogen admission valves 44 to accomplish a higher flow of nitrogen through the turbine 10. This embodiment may provide flows of nitrogen greater than 7500 lbs/hr and the cooling may only be limited by maximum shell stress conditions on most units.

This method features controller 40 that includes a computer data acquisition and control system to coordinate the nitrogen admission valves 44, turbine speed, flow of nitrogen, turbine shell 20 and 22 temperatures, turbine rotor 18 temperatures, first stage metal temperature, axial shell to rotor clearance, and needed information as applicable. The controller 44 is equally applicable to any embodiment of the present invention. The controller 44 also avoids turbine over speed.

A combination of additional field equipment and additional project procedures are helpful in preventing overspeed condition of the turbine 10. The additional field equipment may include nitrogen stop valves upstream of the control valves 44 for nitrogen admission. The stop valves are preferably the "fail close" design for rapid valve travel to prevent overspeed condition of the turbine. This system and method is a most preferred embodiment for the reasons stated herein.

Figure 5:
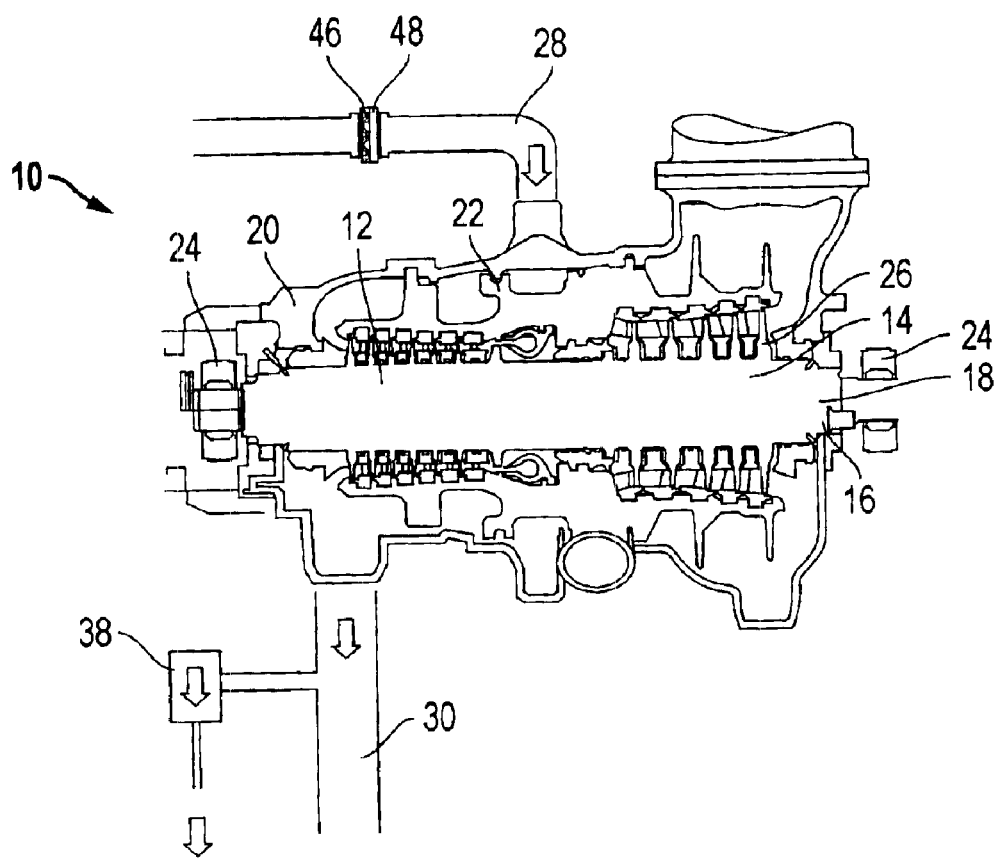
FIG. 5 is diagram including a cross sectional view of an embodiment of the present invention.

Referring to FIG. 5, an arrangement of the system and method similar to the design in FIG. 1 is shown, but with different nitrogen gas connection points. This system and method includes nitrogen gas inlet 46 through the main steam inlet piping 28 such that the flow of nitrogen moves from the main steam inlet piping 28 to the turbine 10 and from the turbine 10 to the cold reheat line 30. From the cold reheat line 30, the flow of nitrogen moves through the cold reheat drain pots 38 and is vented to the atmosphere. This embodiment may be a consideration for turbine cooling using the main steam inlet piping 28 as a method of nitrogen gas injection.

Another aspect of the present invention is the economic efficiencies and the benefits of the present invention. A modem steam generating plant produces electricity at a cost of $18.00 US to $35.00 US per megawatt hour ("MW/hr") of operation. A nuclear powered plant produces electricity at a cost of about $18.00 US per MW/hr. A large coal plant produces electricity at a cost of about in the $23.00 to to $28.00 range and a gas plant produces electricity at a cost of about $25.00 to $30.00 range. Older less efficient coal, oil or gas fired plants or gas fired turbines produce electricity at a cost that can be as high as $40 to $45.00 per MW/hr.

The time required to cool down a given steam turbine depends on its size and the operating temperatures and pressures. A nuclear plant turbine is the largest in physical size, but lower in operating temperature and pressure and usually in the megawatt capacity of more than about 1,000 MW. These units require approximately ten days to cool down by conventional methods. Fossil fired generating units using coal, oil, or gas can be as large as a nuclear steam turbine, but most units operate at higher pressures and temperatures. Most of the fossil units are in the about 400 to about 600 MW capacity size. The cool down of the smaller fossil units using conventional methods are from about five to about seven days.

When a plant is offline, the lost production cost can be much higher than the cost of operating the plant if the electrical demand is up. A nuclear plant can produce power at $18.00 per MW/hr, but the company may have to purchase power on the power grid that is generated by gas turbines that can cost as much as $45.00 per MW/hr. The following provides the daily operating costs and potential savings associated with the use of the present invention.

TABLE 1

Daily Operating Costs and Potential Savings

| Type of Plant | Daily Operating/ MW Size | Costs & Potential Savings/ Product Cost | Daily Cost/Savings |
| --- | --- | --- | --- |
| Nuclear | 1000 | $18.00 | $432,000 |
| Fossil | 1000 | $25.00 | $600,000 |
| Fossil | 800 | $25.00 | $480,000 |
| Fossil | 600 | $25.00 | $360,000 |
| Fossil | 400 | $28.00 | $268,000 |
| Fossil | 200 | $30.00 | $144,000 |

This table shows that each day that can be saved in cooling down a given turbine, dependent of MW size and MW cost of product, can save a power plant from $144,000 to $600,000 per day. In a nuclear plant, that could be a cost saving amounting to as much as $3 M in one shutdown for seven days. On an average size 600 MW plant, the saving could also be as high as $3 M, with a smaller power production unit savings being as little as $0.5 M. This shows that the production costs savings can be very substantial with a very high "value added" worth to this service to a given power plant operation.

Having described the invention above, various modifications of the techniques, procedures, material and equipment will be apparent to those in the art. It is intended that all such variations within the scope and spirit of the appended claims be embraced thereby.

What is claimed is:

1. A method of cooling a steam turbine having internal moving components to a predetermined temperature, wherein the steam turbine comprises injection points, the method which comprises the steps of:

(a) stopping the flow of steam;
(b) introducing a flow of nitrogen to the turbine until the turbine reaches the predetermined temperature while controlling the flow of nitrogen at the injection points to prevent damage to the moving components of the turbine by achieving uniform cooling of the internal moving components; and
(c) stopping the flow of nitrogen wherein the injection points comprise a main steam inlet piping connected to the turbine and a cold reheat line connected to the turbine such that a flow of steam first moves from the main steam inlet piping to the turbine and then the flow of steam moves from the turbine to the cold reheat line during operation, wherein the steam turbine further comprises a hot reheat line connected to the turbine and a condenser vacuum relief line connected to the turbine such that a flow of steam first moves from the hot reheat line to the turbine and then the flow of steam moves from the turbine to the condenser vacuum relief line during operation, and wherein the flow of nitrogen in also moves in the hot reheat line during Step (b).

2. The method of claim 1, wherein the flow of nitrogen moves from the main steam inlet piping to the turbine and then the flow of nitrogen moves from the turbine to the cold reheat line during Step (b).

3. The method of claim 1, wherein the flow of nitrogen moves from the cold reheat line to the turbine and then the flow of nitrogen moves from the turbine to the main steam inlet piping during Step (b).

4. The method of claim 1, wherein the flow of nitrogen in also moves from the hot reheat line to the turbine and then the flow of nitrogen moves from the turbine to the condenser vacuum relief line during Step (b).

5. The method of claim 2, wherein the flow of nitrogen in also moves from the hot reheat line to the turbine and then the flow of nitrogen moves from the turbine to the condenser vacuum relief line during Step (b).

6. The method of claim 3, wherein the flow of nitrogen in also moves from the hot reheat line to the turbine and then the flow of nitrogen moves from the turbine to the condenser vacuum relief line during Step (b).

7. The method of claim 2, wherein the main steam inlet piping comprises a main steam inlet piping drain line connected to the main steam inlet piping, the method wherein the flow of nitrogen moves from the main steam inlet piping drain line to the main steam inlet piping during Step (b).

8. The method of claim 7, wherein the flow of nitrogen also moves from the hot reheat line to the turbine during Step (b).

9. The method of claim 3 wherein the turbine further comprises a cold reheat drain pots connected to the cold reheat line, the method wherein the flow of nitrogen moves through the cold reheat drain pots to the cold reheat line in Step (b).

10. The method of claim 3 wherein the turbine further comprises a cold reheat drain pots connected to the cold reheat line, the method wherein some of the flow of nitrogen moves through the cold reheat drain pots to the cold reheat line in Step (b).

11. The method of claim 3 wherein the turbine further comprises a cold reheat drain pots connected to the cold reheat line, the method wherein the flow of nitrogen moves through the cold reheat line to the cold reheat drain pots in Step (b).

12. The method of claim 1, the method which further comprises the step of controlling the flow of nitrogen during Step (b) with a computer control system.

13. The method of claim 1, which further comprises introducing a heated flow of nitrogen to the turbine to preheat the internal moving components of the turbine after Step (c).

14. A system for cooling a steam turbine to a predetermined temperature using a flow of nitrogen, the system comprising:

a steam turbine;
a main steam inlet piping connected to the turbine;
a cold reheat line connected to the turbine; and
a control station for controlling the flow of nitrogen to prevent damage to the moving components or the turbine;
a hot reheat line connected to the turbine; and
a condenser vacuum relief line connected to the turbine;

wherein the hot reheat line and the condenser vacuum relief are adapted to accommadate the flow of nitrogen; and wherein the steam turbine, the main steam inlet piping, and the cold reheat line are adapted to accommodate the flow of nitrogen.

15. The system of claim 14 further comprising a main steam inlet piping drain line connected to the main steam inlet piping wherein the main steam inlet piping drain line is adapted to accommodate the flow of nitrogen.

16. The system of claim 14 further comprising a cold reheat drain pots connected to the cold reheat line adapted to accommodate the flow of nitrogen.

17. The system of claim 14 further comprising a computer control system wherein the computer control system is adapted to control the flow of nitrogen.

18. The System of claim 14 wherein the predetermined temperature is less than about 200° F.

19. A method of providing a more efficient and cost effective method of operating a power plant, the method which comprises the Step of reducing downtime by cooling each steam turbine using the method of claim 1.

* * * * *

UNITED STATES PATENT AND TRADEMARK OFFICE
CERTIFICATE OF CORRECTION

PATENT NO. : 6,898,935 B2
DATED : May 31, 2005
INVENTOR(S) : Barber et al.

It is certified that error appears in the above-identified patent and that said Letters Patent is hereby corrected as shown below:

Column 4,
Line 33, please delete "to-".

Column 9,
Line 3, please delete "modem" and insert therefor -- modern --.

Column 10,
Line 26, following "in-service" please delete "service".

Column 11,
Line 8, please delete "Modem" and insert therefor -- Modern --.

Column 12,
Line 3, please delete "modem" and insert therefor -- modern --.
Line 7, please delete the second occurrence of "to".

Signed and Sealed this

Twenty-fifth Day of October, 2005

JON W. DUDAS
*Director of the United States Patent and Trademark Office*